Jan. 12, 1971    J. F. MASON ET AL    3,554,581

SEAL ASSEMBLY IN CONDUIT CONNECTION

Filed May 23, 1968

INVENTORS
JOHN F. MASON
BRUCE J. FRAZIER
NORMAN L. FREEMAN, JR.

BY Burns, Doane, Benedict, Swecker & Mathis
ATTORNEYS

United States Patent Office 3,554,581
Patented Jan. 12, 1971

3,554,581
SEAL ASSEMBLY IN A CONDUIT CONNECTION
John F. Mason, Bruce J. Frazier, and Norman L. Freeman, Jr., Duncan, Okla., assignors to Halliburton Company, Duncan, Okla., a corporation of Delaware
Filed May 23, 1968, Ser. No. 731,424
Int. Cl. F16l 21/06
U.S. Cl. 285—367                    9 Claims

ABSTRACT OF THE DISCLOSURE

A seal assembly for a conduit connection including a first and a second conduit part, each having an axially extending flow passage and an end surface radially intersecting the flow passage. Each of the conduit parts includes an internal sealing cavity adjacent the end surface and radially off-set from the flow passage. A composite sealing ring is interposed between the conduit parts and extends into the two sealing cavities. The composite sealing ring includes a central rim portion from which extend two generally axially disposed lip portions projecting oppositely outwardly into the conduit sealing cavities. An elastomeric sealing member extends peripherally about each of the lip portions and into conforming engagement with the internal sealing surfaces of the conduit parts. The composite sealing ring also includes two generally axially disposed flexible sealing flanges extending oppositely outwardly from the central rim at a position radially outwardly from the lip portions. A portion of each of the elastomeric sealing members engages each of the flexible sealing flanges. A clamping assembly is positioned about the conduit parts to draw them together and force the elastomeric sealing members to redistribute their volume and conformingly engage the internal condit sealing surfaces. The clamping assembly is also operative to draw the conduit parts further together and cause the portions of the elastomeric members which engage the flexible sealing flanges to redistribute their volume and force the flexible flanges radially outwardly into sealing engagement with the internal conduit sealing surfaces.

BACKGROUND OF THE INVENTION

This invention relates to a seal assembly in a conduit connection. In particular this invention relates to a composite seal of the type having a relatively hard internal annular portion on which is mounted a flowable elastomeric material, the seal being adapted to be removably interposed between adjacent conduit parts.

In conducting fluid flow along a conduit, it has been common for many years to releasably join conduit sections in order to provide a conduit path of desired length. It is often desirable to put some form of sealing unit between adjacent conduit sections so that leakage of fluid at the conduit joints may be avoided. To obtain a positive leak proof seal it is desirable to force the seal member into positive engagement with internal sealing surfaces of the conduit parts to be joined.

However, the force applied to the seal, while of a magnitude sufficient to obtain positive sealing engaement, must not be so great as to detrimentally affect the seal. In order to reduce the possibility of damaging the seal with excess pressure that forces the seal into engagement with the conduit, it has become necessary to employ seal rings of a substantially hard material such as steel.

At least one prior seal of this type includes a seal ring from which oppositely disposed flexible sealing lips extend in a generally axial direction. The seal ring is interposed between two adjacent conduit parts which are drawn together by a clamping arrangement. As the clamping arrangement is tightened, the flexible lips are deflected radially inwardly of the conduit by mating internal conduit sealing surfaces. In the known prior device, an external rib portion extends radially outwardly from the seal ring and is engaged by opposed end faces of the conduit parts that are drawn together.

Although prior seals of the type described are often adequate, they may sometimes prove unsatisfactory for a number of reasons. For example, since the flexible sealing lips are made of a generally incompressible material such as steel, some small voids sometimes exist between the sealing lips and the internal sealing surfaces of the conduit parts. Therefore, with this type of assembly a truly leak proof seal may not always be obtained. Such a leak proof seal is highly desirable for any seal intended to be used with extreme high pressure fluid flow because of the destructive cutting action of small streams of fluid at high pressures.

Another disadvantage of the previously described prior structure resides in the fact that the flexible sealing lips are deflected radially inwardly with respect to the conduit parts. If the inward radial deflection is too great or too small, then a diameter change of the fluid flow path occurs at the point of the seal. Such a diameter change increases the possibility of creating turbulence at the conduit joint. In high volume fluid flow where the fluid contains abrasive particles such as is the case with fracturing work, it is desirable to minimize turbulence effects.

Furthermore, if the flexible lips of the previously described ring are overstressed or fatigued, the seal may be lost.

SUMMARY OF THE INVENTION

It is, therefore, a general object of the invention to provide a seal assembly of the type used at fluid conduit joints intended to obviate or minimize disadvantages of the sort previously noted.

It is a particular object of the invention to provide a seal assembly at fluid conduit joints wherein substantially zero clearance is obtained between the seal member and the internal sealing surfaces of the conduit parts to be joined.

It is another object of the invention to provide a substantially fail-safe seal assembly having two independent sealing structures.

It is a further object of the invention to provide a seal assembly for conduit parts to be joined so designed that turbulence at the conduit joint is minimized.

It is a still further object of the invention to provide a method for assembling a seal unit wherein the method reduces the likelihood of any voids occurring between the seal and mating conduit sealing surfaces.

A preferred embodiment of the invention intended to accomplish at least some of the foregoing objects comprises a sealing ring adapted to be interposed between two opposed conduit parts and to mate with internal sealing surfaces of the conduit parts. The sealing ring includes an annular central rim portion from which two oppositely disposed lip portions extend axially outwardly. An elastomeric sealing member is mounted peripherally about each of the lip portions. The elastomeric material is adapted to be forced to conformingly contact internal sealing surfaces of the conduit parts when the sealing ring is interposed therebetween. Two oppositely disposed flexible sealing flanges also extend axially outwardly from the lip portions. Part of the elastomeric sealing material engages the flexible lip portions, so that any pressure tending to cause that part of the elastomeric material to redistribute its volume, will force the flexible sealing flanges radially outwardly into engagement with mating internal sealing surfaces of the conduit parts.

In order to align the conduit parts with respect to the sealing ring, rib means, extending generally radially outwardly from the central rim portion, is employed. The rib means acts as an alignment member by contacting opposing end faces of the conduit parts and thereby insuring a minimum of diametrical or directional charge at the conduit joint.

A selectively operable connecting means is in contact with the conduit parts to be joined and is operative to draw them together by an initial amount. This initial amount is sufficient to cause the elastomeric material to conformingly contact the internal sealing surfaces of the conduits and form a first seal therewith. The connecting means is also operable to draw the conduit parts further together, so that the portions of the elastomeric material in contact with the flexible sealing flanges will redistribute their volume. The volume redistribution results in a force on the sealing flanges which causes them to engage the conduit sealing surfaces and form another seal therewith. The method of drawing the conduit parts together thereby provides a substantially fail-safe seal assembly including two independent seals.

Another aspect of the invention is that the internal diameter of the seal ring and the diameters of the flow passages in the conduit parts that are joined are substantially the same, thereby reducing the possibility of creating turbulence at the conduit joint.

THE DRAWINGS

A seal assembly constructed in accordance with a preferred embodiment of the invention is illustrated in the accompanying drawings in which.

DETAILED DESCRIPTION

General summary

Figure 1:
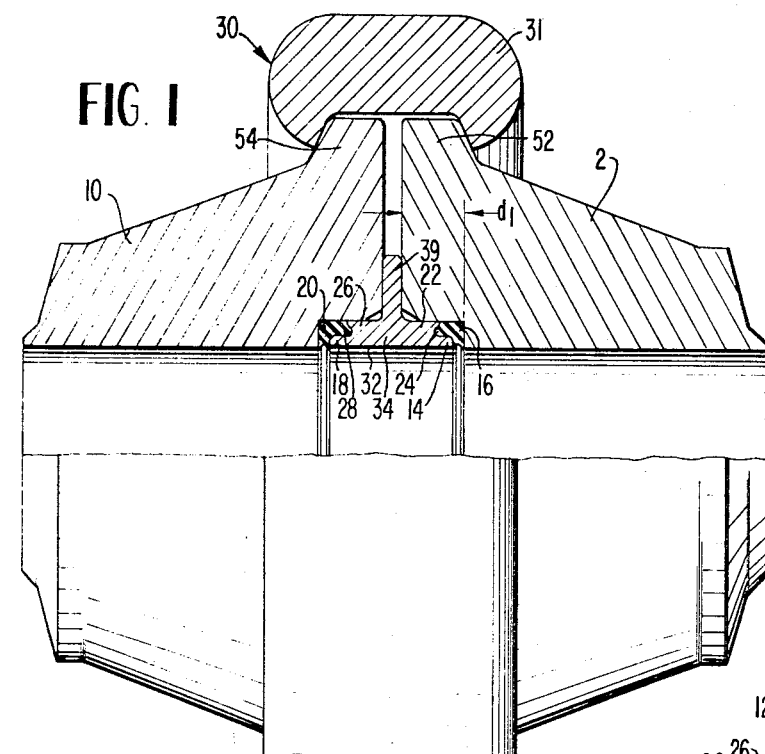
FIG. 1 is a partial cross sectional side view of a seal assembly according to a preferred embodiment of the present invention.
Figure 2:
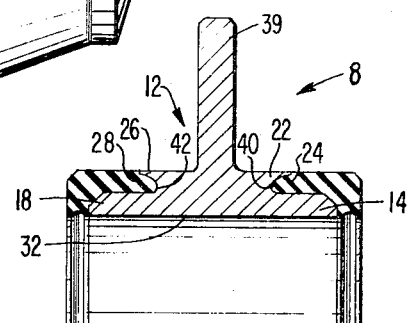
FIG. 2 is an end view of the seal assembly shown in FIG. 1 taken along the line 2—2 therein.

Referring to FIG. 1 of the drawings, a seal assembly according to a preferred embodiment of the invention is there shown.

Figure 3:
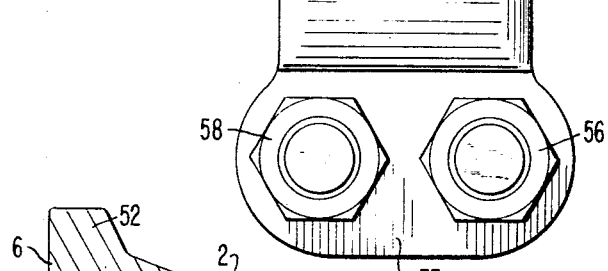
FIG. 3 is a cross sectional side view of one of the conduit parts shown in FIG. 1.
Figure 3:
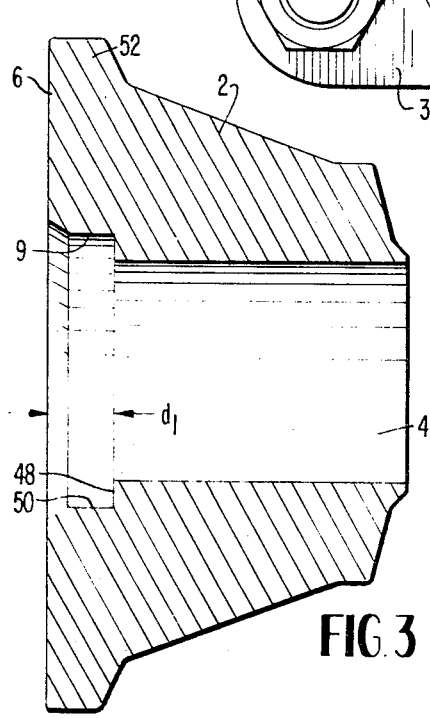

The assembly includes a first conduit part 2 (FIG. 3) having an axially extending flow passage 4 which is radially intersected by an end face 6. Adjacent the end face, the conduit is provided with a sealing cavity 9 that is radially offset with respect to the flow passage 4.

A composite annular seal 8 (FIG. 4) is interposed between the conduit part 2 and a substantially identical but mirror image disposed, second conduit part 10. The seal 8 includes an inner annular ring 12 from which a generally axially extending first lip portion 14 projects into a sealing cavity 9 of the conduit part 2. A first elastomeric seal member 16 extends peripherally about the lip portion 14 and conformingly engages the conduit part 2 in the sealing cavity 9. A second generally axially extending lip portion 18 and a second elastomeric sealing member 20 similarly extend into the second conduit part 10.

The seal ring 12 also includes a generally axially extending first flexible sealing flange 22 which projects into the sealing cavity 9 of the conduit part 2. A portion 24 of the elastomeric member 16 engages the flange 22. Similarly, extending into the conduit part 10 is a second flexible sealing flange 26 which is engaged by a portion 28 of the elastomeric member 20.

Positioned about conduit parts 2 and 10 is a clamping assembly 30 that is operative to draw the conduit parts together. The elastomeric members 16 and 20 are thereby caused to redistribute their volumes and take up any small voids between the elastomer and the internal sealing surfaces of the conduits. The clamping assembly 30 is operative to draw the conduit parts further together and cause the portions 24 and 28 of the elastomeric members to force flexible sealing flanges 22 and 26 radially outwardly into engagement with the internal conduit sealing surfaces.

In this way, the elastomeric material forms a first seal and greatly increases the leak proof nature of the seal by conformingly contacting the internal sealing surfaces of the conduit.

Furthermore, a second seal is provided by the flexible sealing flanges 22 and 26. The possibility of ruining the sealing properties of the sealing flanges by fatigue or overstressing is reduced since the flanges are radially deflected in response to axial pressure on the conduit parts after the elastomer has initially redistributed its volume to take up small voids. If any axial pressure is applied to the elastomer, beyond that pressure which is needed to flex the flanges into sealing engagement, the elastomer may escape around lip portions 18 and 14 instead of exerting further pressure on the flanges.

Detailed structure

The previously mentioned composite annular seal 8 comprises an annular sealing ring 12 of relatively hard material such as machined metal or the like. The ring 12 includes a central rim portion 34 and a plurality of radial and axial projections. The generally axially disposed lip portions 14 and 18 constitute the radially innermost projections extending from the rim portion 34. The lip portions 14 and 18 define annular, peripheral support shelves 36 and 38 respectively. Extending about these support shelves, is elastomeric sealing means comprising the two elastomeric members 16 and 20. Each of the elastomeric members has an undercut groove 17 and 19 facing radially inwardly of the seal. In the preferred embodiment shown in FIG. 4, the elastomeric members 16 and 20 are rings molded from Hycar and bonded to the support shelves 36 and 38. However, the particular material for the elastomer sealing means is not critical, and it is only necessary that the material be such that it will flow slightly when compressive forces are exerted on it.

The previously described, generally axially disposed flexible sealing flanges 22 and 26 also extend oppositely outwardly from the central rim portion 34, but at a position radially outwardly from the lip portions 14 and 18. These flexible sealing flanges, together with their adjacent lip portions, define expandable support pockets 40 and 42 in which the seated portions 24 and 28 of the elastomeric material are inserted. Each of the flexible sealing flanges also includes an external sealing surface 44 and 46 adapted to mate with the internal sealing surfaces of the conduit parts 2 and 10.

Figure 4:
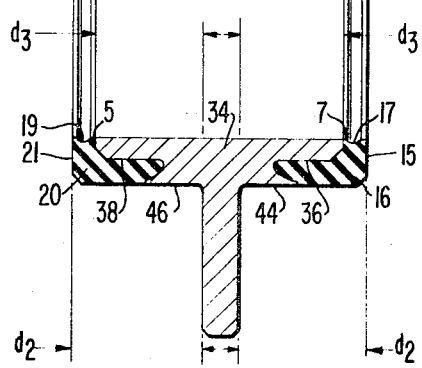
FIG. 4 is a cross sectional view on an enlarged scale of the composite sealing member shown in FIG. 1 with the seal shown before insertion into the conduit parts.

The internal sealing surfaces of the conduit part 2 are formed in the previously mentioned internal sealing cavity 9 (FIG. 3) by a radially extending, annular internal sealing shoulder 48 which intersects an axially extending, annular internal sealing shoulder 50. For a purpose hereinafter described, the total internal axial length $d_1$ of the conduit part 2, from the sealing shoulder 48 to the end face 6, is greater than the axial extent $d_3$ of the lip portion, but is less than the axial length $d_2$ of the seal member 8 when the elastomeric means is uncompressed (FIG. 4). The internal sealing cavity of the conduit part 10 is similarly defined.

The previously mentioned clamping assembly 30 includes two clamp pieces 31 and 33 mounted about the conduit parts 2 and 10 in engagement with a first and second projection 52 and 54 formed on the radially outermost portions of the conduit parts 2 and 10 respectively. The assembly may be tightened to draw the conduit parts together by the conventional tangential draw bolts 56, 58 and 60. The particular clamping means used to draw the conduit parts together is not critical. The clamping arrangement shown could be replaced by inserting bolts through the projections 52 and 54 for quick disconnect service, or by any other structure that will enable an operator to pull the two conduits together and hold them.

When the composite seal 8 is interposed between the adjacent conduit parts 2 and 10 (FIG. 1), initial drawing pressure provided by the clamp assembly 30 will cause the elastomeric members 16 and 20 to flow slightly and fill small voids between the elastomeric members and the internal sealing shoulders 48 and 50 (FIG. 3) of the conduit. This flowing is caused by compression of the elastomeric members by the conduit parts 2 and 10 because the previously mentioned conduit axial dimension $d_1$ is less than the axial lengths $d_2$ defined by the axial extent of lip portions 14 and 18 and the axially outermost portions 15 and 21 of the elastomeric members.

After the elastomeric means has redistributed its volume and taken up the previously mentioned small voids, any further drawing pressure provided by the clamp assembly 30 will exert further compressive forces on the elastomer. These further compressive forces cause the seated portions 24 and 28 of the elastomeric members to expand the support pockets 40 and 42 and thereby deflect the flexible sealing flanges 22 and 26 generally radially outwardly into engagement with the internal sealing surfaces 50 of the conduits.

The previously mentioned undercut grooves 17 and 19 provide a means for controlling the pressure on the flexible sealing flanges 22 and 26 once they are radially flexed responsive to axial pressure on the elastomer. Any further axial pressure on the elastomer will not be immediately transmitted to the flanges because the elastomer may first escape around lip portions 18 and 14 and tend to close the grooves 17 and 19. The existence of this escape route is insured because the previously mentioned conduit dimension $d_1$ is greater than the axial extent $d_2$ of the axially outermost portions 5 and 7 of the lip portions. Therefore, the conduit sealing shoulder cannot abut the lip portions and close the escape route.

It will be appreciated that the composite seal 8 is particularly adapted for use in high pressure fluid flow lines such as discharge lines for fracturing work. The internal ring 12 provides the desirable characteristics of a substantially rigid sealing member, while the elastomeric sealing member 16 and 20 minimize the problem caused by the fact that rigid sealing members do not always conformingly engage with surfaces to be sealed.

The outward radial deflection of the flexible sealing flanges 22 and 26 does not affect the internal diameter 32 of the sealing ring. Therefore, the possibility of creating turbulence at the conduit joint is minimized. Furthermore, since the deflection of sealing flanges 22 and 26 forms a second seal in addition to the first seal formed by the elastomeric means, the danger of losing the seal due to fatigue or overstressing of the metal flanges is eliminated.

In order to reduce the possibility of undesirable diametrical or directional changes at the conduit joint, seal ring 12 is provided with an alignment member 39. Member 39 extends generally axially outwardly from the central rim portion 34, and contacts the opposing end faces 6 of the conduit parts when they are drawn together by the clamp assembly 30. In this way, the conduit parts 2 and 10 are aligned with respect to the sealing member 8.

If an alignment member 39 is not included in the seal 8, then it is not necessary for the conduit dimension $d_1$ to be less than the seal dimension $d_2$. In this case the overall axial dimension of the seal, when the elastomer is uncompressed, should be greater than the distance between the internal sealing shoulders 48 of the conduit parts 2 and 10 when they are joined, in order for compression to occur. Furthermore, in order to provide an escape route for the elastomer, the distance between the shoulders 48 when the conduit parts are joined should be greater than the overall axial extent of the lip portions of the seal.

OPERATION AND METHOD OF ASSEMBLY

To assemble the seal unit of the present invention, composite seal 8 is first inserted into the sealing cavity 9 of the conduit part 2. Because of the dimensions of the seal 8, the elastomeric member 16 will contact the sealing shoulder 48 of the conduit sealing cavity before the rib means 39 of the seal contacts the end face 6 of the conduit. Next, conduit part 10 is slipped over the exposed end of the seal 8 until its internal sealing shoulder bottoms on the elastomeric member 20. The clamping assembly 30 is then placed into engagement with the projections 52 and 54 on the conduit parts. An initial drawing force provided by the clamping assembly 30 exerts compressive longitudinal forces on the elastomer, causing it to flow slightly and fill any small voids previously existing between the internal sealing surfaces of the conduits and the elastomeric members 16 and 20. Any further force tending to draw the conduit parts 2 and 10 together causes the elastomer to further redistribute its volume because of the increased longitudinal compressive forces. Such a redistribution of volume causes the support pockets 40 and 42 to be expanded by the seated portions 24 and 28 of the elastomer, and to deflect flexible sealing flanges 22 and 26 radially outwardly into sealing engagement with the mating internal sealing surfaces 50 of the conduits. Rib means 39 acts as an alignment member for the conduit parts with respect to the composite seal 8.

SUMMARY OF ADVANTAGES

It will be seen that in following the present invention, a seal assembly which is particularly effective in fluid flow line connections is provided.

Of particular significance is the provision of a leak proof seal with both the strength and rigidity of a relatively hard seal member and having the added advantage of minimizing the possibility of any voids occurring between an elastomeric seal and its mating conduit surfaces.

Also of importance in this connection is the provision of flexible sealing flanges as a second independent seal. Since these flanges deflect radially outwardly of the conduit flow path, there is little danger of a diameter change at the conduit joint or of the resulting turbulence caused by such a diameter change.

Other advantages are provided by the alignment rib means which aligns the conduit parts with respect to the seal member.

Furthermore, all sealing surfaces of the conduit parts are in a female cavity and will not be subjected to damage during handling.

A particular advantage in the method of assembling the seal unit of the present invention is the insurance of a fail-safe, leak-proof seal by drawing the conduit parts together to first cause the elastomer to conformingly engage the internal conduit sealing surfaces, and then drawing the conduit parts further together to cause the flexible sealing flanges to form a second seal.

We claim:

1. A composite sealing ring adapted to be interposed between two opposed conduit parts and to mate with internal surfaces of the conduit parts, the sealing ring comprising:
   an annular member of relatively hard material including
   a central rim portion, and two generally axially disposed lip portions extending longitudinally oppositely outwardly from said central rim portion, each of said lip portions defining a longitudinally extending peripheral support shelf, said shelf having a cylindrical outer surface, deformable sealing means extending continuously peripherally about said support shelves and radially along at least a portion of the ends of said lip portions, said deformable sealing means being adapted to conformingly contact the internal surfaces of the conduit parts when said sealing ring is interposed therebetween, said annular member further including
- two generally axially disposed, flexible sealing flanges extending longitudinally oppositely outwardly from said central rim portion at a position ratially outwardly from said lip portions, each of said flexible sealing flanges having a cylindrical outer surface and a tapered inner surface defining together with an adjacent one of said support shelf cylindrical surfaces, a longitudinally outwardly facing expandable support pocket, and
- at least a portion of said deformable sealing means being seated in each of said expandable support pockets and adapted to expand said pockets in response to axially compression engagement between said conduit parts and said deformable sealing means and thereby move said flexible sealing flanges radially outwardly into sealing engagement with the internal surfaces of said conduit parts.

2. A composite sealing ring as defined in claim 1 wherein:
the radially innermost surfaces of said central rim portion and said lip portions define a continuous cylindrical surface having a substantially constant diameter.

3. A composite sealing ring as defined in claim 1 wherein said annular member further includes,
rib means, extending generally radially outwardly from said central rim portion, adapted to contact opposing end faces of the conduit parts and to align the conduit parts with respect to said sealing ring.

4. A composite sealing ring as defined in claim 1 wherein:
the radially extending portions of said deformable sealing means are each provided with a radially, inwardly facing pressure relief groove.

5. A seal assembly comprising:
first and second conduit parts, each of said conduit parts including:
- an axially extending flow passage,
- an end surface radially intersecting said flow passage, and
- an internal sealing surface adjacent said end surface and extending radially outwardly from said flow passage, said end surfaces being oppositely disposed,
a composite sealing ring interposed between said first and second conduit parts, said composite sealing ring comprising:
an annular member of relatively hard material including:
- a central rim portion, and
- two generally axially disposed lip portions extending longitudinally oppositely outwardly from said central rim portion, each of said lip portions defining a longitudinally extending peripheral support shelf, said shelf having a cylindrical outer surface, deformable sealing means extending continuously peripherally about said support shelves and into engagement with said internal sealing surfaces of said conduit parts, and radially along at least a portion of the ends of said lip portions, said deformable sealing means being adapted to conformingly contact said internal sealing surfaces of said conduit parts;

said annular member further including:
- two generally axially displaced, flexible sealing flanges, extending longitudinally oppositely outwardly from said central rim portion at a position radially outwardly from said lip portions, each of said flexible sealing flanges having a cylindrical outer surface and a tapered inner surface defining, together with an adjacent one of said support shelf cylindrical surfaces, a longitudinally outwardly facing expandable support pocket,
- at least a portion of said deformable sealing means being seated in each of said expandable support pockets and adapted to expand said pockets in response to axially compressive engagement between said conduit parts and said deformable sealing means and thereby move said flexible sealing flanges radially outwardly into sealing engagement with the internal surfaces of said conduit parts, and
- selectively operable connecting means for drawing said conduit parts toward one another to cause said deformable sealing means to be forced to conformingly contact said internal sealing surfaces and to cause said sealing flanges to flex radially into sealing engagement with said internal sealing surfaces of said conduit parts in response to compressive engagement between said flanges, said deformable sealing means, and said conduit parts.

6. A seal assembly as defined in claim 5 wherein:
the radially innermost surfaces of said central rim portion and said lip portion define a continuous cylindrical surface aligned with said flow passages.

7. A seal assembly as defined in claim 5 wherein said annular member includes,
rib means, extending generally radially outwardly from said central rim portion,
said rib means being adapted to contact said oppositely disposed end surfaces and to align said conduit parts with respect to said composite sealing ring;
said selectively operable connecting means being operative to draw said end surfaces into engagement with said rib means.

8. The seal assembly as defined in claim 5 wherein:
said flow passages are axially aligned and have substantially equal internal diameters, and
said central rim portion and said lip portions form a continuous internal surface with a diameter substantially equal to the diameters of said flow passages.

9. A seal assembly as defined in claim 5 wherein:
the radially extending portions of said deformable sealing means are each provided with a radially, inwardly facing pressure relief groove.

References Cited
UNITED STATES PATENTS

| | | | |
|---|---|---|---|
| 2,376,017 | 5/1945 | Smallpeice | 277—235X |
| 2,403,364 | 7/1946 | Hertzell et al. | 277—225 |
| 2,517,290 | 8/1950 | DeMoude et al. | 277—225 |
| 2,635,900 | 4/1953 | Mayo et al. | 285—334.2X |
| 2,699,344 | 1/1955 | Bissell | 285—341X |
| 2,764,311 | 9/1956 | Blackman | 277—235X |
| 2,775,471 | 12/1956 | Douglass | 285—334.2X |
| 2,999,700 | 9/1961 | Smith | 285—334.2X |

LAVERNE D. GEIGER, Primary Examiner

E. J. EARLS, Assistant Examiner

U.S. Cl. X.R.
277—225, 235